(12) United States Patent
Sharma et al.

(10) Patent No.: US 7,355,752 B2
(45) Date of Patent: Apr. 8, 2008

(54) TWO-DIMENSIONAL CALIBRATION ARCHITECTURES FOR COLOR DEVICES

(75) Inventors: Gaurav Sharma, Webster, NY (US); Raja Bala, Webster, NY (US); Jean-Pierre R. N. Van de Capelle, Rochester, NY (US); Martin S. Maltz, Rochester, NY (US); Lalit K. Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1003 days.

(21) Appl. No.: 10/465,408

(22) Filed: Jun. 18, 2003

(65) Prior Publication Data

US 2004/0257595 A1  Dec. 23, 2004

(51) Int. Cl.
*H04N 1/50* (2006.01)
*H04N 1/56* (2006.01)

(52) U.S. Cl. .................. 358/1.9; 358/504; 358/3.23
(58) Field of Classification Search .............. 358/1.9, 358/518–520, 501, 504, 522–523, 529, 530, 358/3.23; 382/162, 164, 302, 284, 167, 232; 345/326, 431, 589–890, 243, 690, 700, 593, 345/253; 347/43
See application file for complete search history.

(56) References Cited

U.S. PATENT DOCUMENTS

| | | | |
|---|---|---|---|
| 5,305,119 A | 4/1994 | Rolleston et al. | 358/522 |
| 5,528,386 A | 6/1996 | Rolleston et al. | 358/522 |
| 5,689,350 A | 11/1997 | Rolleston | 358/504 |
| 5,995,653 A * | 11/1999 | Reed et al. | 382/162 |
| 6,178,007 B1 | 1/2001 | Harrington | 358/1.9 |
| 6,262,810 B1 | 7/2001 | Bloomer | 358/1.9 |
| 6,330,078 B1 | 12/2001 | Wang | 358/1.9 |
| 6,360,007 B1 | 3/2002 | Robinson et al. | 382/162 |
| 6,546,296 B1 * | 4/2003 | Hara | 700/37 |
| 6,744,534 B1 * | 6/2004 | Balasubramanian et al. | 358/1.9 |

* cited by examiner

*Primary Examiner*—Kimberly Williams
*Assistant Examiner*—Charlotte M. Baker
(74) *Attorney, Agent, or Firm*—Kermit D. Lopez; Luis M. Ortiz; William B. Shelby

(57) ABSTRACT

A color output device is generally driven by at least three independent control signals for control of its response. A desired response in device independent color space is normally obtained by employing a cascade consisting of a characterization transform and calibration transform. The calibration transform transforms input control variables into output control variables that are directly used to drive the device. Input control variables can be transformed into intermediate control variables, which can be then mapped to output control variables utilizing a two-dimensional transformation. The two-dimensional calibration architecture provides improved control functionality and flexibility.

20 Claims, 6 Drawing Sheets

TWO-DIMENSIONAL CALIBRATION ARCHITECTURES FOR COLOR DEVICES

TECHNICAL FIELD

Embodiments are generally related to the field of color image/text printing and display systems. Additional embodiments are related to methods and systems for calibrating color output devices, such as color displays, color printers and other color rendering devices.

BACKGROUND OF THE INVENTION

In modern business, economic, and scientific environments, color has become essential as a component of communication. Color facilitates the sharing of knowledge and ideas. Companies involved in the development of digital color document output devices are continuously searching for techniques, which can improve the accuracy and total image quality of their products.

Color images are commonly represented as one or more separations, each separation comprising a set of color density signals for a single primary or secondary color. Color density signals are commonly represented as digital pixels, which vary in magnitude from a minimum to a maximum, with a number of gradients corresponding to the bit density of the system. Thus, for example, a common 8-bit system can provide 256 shades of each primary color.

A color can therefore be considered as the combination of magnitudes of each pixel, which when viewed together present the combination color. Usually, printer signals include three subtractive primary color signals (i.e., Cyan, Magenta and Yellow) and a Black signal, which together can be considered the printer colorant signals. Each color signal forms a separation, and when combined together with the other separations forms the color image.

It is desirable to specify document properties in a device-independent fashion in order to facilitate the exchange and reuse of documents where possible. Colors are therefore preferably specified in a device-independent color space based on the characteristics of human vision. In order to print or display a given color, it is often necessary to determine the device control values corresponding to specified device-independent color values, because the native control spaces of output devices (e.g., a printer's CMYK values) do not constitute device-independent color spaces. This normally can be accomplished utilizing a three-step procedure.

First, a set of color patches with pre-determined device control values is output on the device and the color of each patch is measured in device-independent color coordinates. Second, utilizing the device control values and the corresponding measured device-independent color values, a "forward device-response function" can be estimated. Third, the "forward device-response function" can be "inverted" to obtain a "device-correction-function".

The "forward device-response function" of step two represents the mapping from device control values to the device independent color values produced by the device in response to the control values. The "device-correction-function" of step three maps each device-independent color to the device control values that produce the specified device-independent color value on the output device. The "device-correction-function" is typically pre-computed and stored in memory. In order to produce a given color on the output device, the corresponding device-independent color values are mapped through the "device correction-function" to obtain control values. When the device is driven with such control values, a desired color can be produced.

It is common practice to separate the "device correction-function" into two parts: a "calibration" function that immediately precedes the device and a "characterization" function, which addresses the device "through" the calibration function. This separation is illustrated in FIG. 1 for the case of a conventional CMYK printer. In FIG. 1, a conventional system 100 is depicted, which can be implemented as a CMYK printer. System 100 can be divided into a "device-correction function" 105 and a "calibration device" portion 107. The "device correction function" 105 can be partitioned into characterization and calibration portions, respectively represented by a characterization routine 102 and a calibration unit 104.

A device independent color can be provided as input 110 to the characterization routine 102, whose output can be fed to a calibration unit 104. The output from calibration unit 104 can be provided in turn to an output device 106 as indicated by an output line 114. Additionally, line 112 indicates alternate CMYK (i.e., fast emulation). Data can be output from a reprint path unit 108 and fed to the calibration unit 104. In FIG. 1, the "calibration device" portion 107 of system 100 can be formed generally from calibration unit 104 and output device 106.

Another example of a calibration system includes U.S. Pat. No. 5,305,119 to Rolleston et al, "Color Printer Calibration Architecture," which issued on Apr. 19, 1994 and is assigned to Xerox Corporation. U.S. Pat. No. 5,305,119 is generally directed toward a method of calibrating a response of a printer to an image described in terms of colorimetric values. A further example of a calibration method and system is described in U.S. Pat. No. 5,528,386 to Rolleston et al, "Color Printer Calibration Architecture," which issued on Jun. 18, 1996 and is also assigned to Xerox Corporation. U.S. Pat. No. 5,528,386 generally describes a conventional one-dimensional architecture. Both U.S. Pat. Nos. 5,305,119 and 5,528,386 are incorporated herein by reference.

The purpose of a "calibration transformation" is to facilitate a trade-off. Unlike the "full device-correction function," calibration transformation provides control of the output device in a limited and exclusive fashion. In comparison to the full device-correction function, however, the calibration transformation also offers significant advantages in that it requires substantially reduced measurement effort and also a substantially lower computational effort. The lower computational effort requirement allows it to be incorporated in high-speed real-time printing, image-processing chains for which the full device-correction function may be too computational and/or memory intensive. For color output devices, particularly those utilized in the printing arts, calibration can be performed for the Black (K) channel independently and for the Cyan (C), Magenta (M), and Yellow (Y) channels either independently or together.

As an illustrative example, consider the case of a 3-channel (CMY) printer is considered. The goal of calibration is to determine a calibration transform from CMY to C'M'Y' that maintains a desired printer response in selected regions of color space. Additionally, the calibration transform can be required to be computationally efficient with a small memory requirement so that it can be incorporated in high-speed real-time printing paths.

Traditionally, the calibration transform has been applied in the form of one-dimensional correction to the individual channels for the device. For CMY, the calibration can be applied as tone-response corrections (TRCs) for each of the C, M, and Y channels. FIG. 2 illustrates a traditional three-color one-dimensional calibration transformation system 200. As indicated in FIG. 2, arrows 202, 204 and 206 respectively represent C, M, and Y inputs to transformations 214, 216, and 218. Dashed line 212 generally indicates the boundaries of an overall calibration transformation, which can be composed of individual transformations 214, 216, and 218. Outputs are indicated by arrows 208, 210 and 211, which respectively represent C', M' and Y'. It should thus be appreciated that the following equation (1) can be applied to system 200 of FIG. 2:

$$C'=f_1(C), M'=f_2(M), Y'=f_3(Y) \qquad (1)$$

With traditional one-dimensional calibration, either a one-dimensional desired response in terms of delta-E from paper can be specified along the three primary axes, or a three-dimensional CIELAB response can be specified along a one-dimensional locus that satisfies certain monotonicity constraints. The transformation in the rest of CMY space is therefore generally an outcome of the calibration function over which no control is available.

For example, all input points with the same input C value (e.g., M vs. Y plane) can map to the same C' value. The problem with such an approach is that the response in a large part of color space potentially can be compromised to obtain a desired response along a one-dimensional locus. For example, if the TRCs are gray balanced, this can sometimes result in undesirable hue shifts in the reproductions of sweeps from white to secondary device colors (e.g., those lying along the red axis where M=Y, and C=K=0, likewise for green and blue). Conversely, if the TRCs are independently linearized, this will generally not yield gray balance for C=M=Y.

TRCs are obviously very efficient for real-time image processing. Memory requirements are also very minor: for 8-bit processing, 256 bytes of memory are required for each separation's TRC for a total of 768 bytes of storage. Additionally, derivation of the calibration is generally a simple, well-understood process, which involves measuring step wedges of pure C, M, Y and possibly patches near C=M=Y if gray balance is desired.

As an alternative to control of each individual channel for calibration, calibration may be performed as a full three-dimensional function from input C, M, Y to output C', M', Y'. Such a process has traditionally been utilized for characterization in current color management architectures but can be applied to calibration as an option. In this case, equation (2) applies:

$$C'=f_1(C, M, Y), M'=f_2(C, M, Y), Y'=f_3(C, M, Y) \qquad (2)$$

The desired response can be specified at any point in three-dimensional CMY space. Thus it is possible to derive unique 1-1 calibration functions $f_1$, $f_2$, and f3 without any compromise in the desired response. Interactions with device drift may however require some degree of smoothness in the transformations.

If sparse three-dimensional LUTs are used with interpolation, the processing might be too computationally intensive for high speed printing applications. A full resolution LUT with direct lookup avoids interpolation, but might be prohibitively large, especially if several LUTs are required for different media, halftones, etc. For 8 bit processing, for instance, a full three-dimensional LUT would require $3*(256)^3$ bytes=48 MB of storage. Derivation of the calibration is similar to characterization, due to arbitrary three-dimensional control. Typically this involves a large number of measurements.

TRCs are appealing because of simplicity in derivation and processing. TRCs, however, are restrictive in the amount of control over the printer response. Three-dimensional LUTs offer tremendous control, but derivation and image processing are generally much more complex.

BRIEF SUMMARY

It is, therefore, a feature of the present invention to provide improved color printing and display methods and systems.

It is another feature of the present invention to provide improved methods and systems for calibrating color output devices, such as color printers, printing devices and color softcopy displays.

It is also a feature of the present invention to provide for color output device calibration methods and systems, which utilize two-dimensional calibration transforms for calibration thereof.

Aspects of the present invention relate to methods and systems for calibrating a color output device are disclosed herein. A pre-determined transformation can be applied to a plurality of uncalibrated control variables input to a color output device in order to obtain a plurality of intermediate variables. The color output device itself is generally driven by at least three independent control signals for control of the plurality of intermediate variables.

In accordance with embodiments, at least one control variable can be determined utilizing one or more intermediate variables among the plurality of intermediate variables, wherein at least one of the intermediate variables depends on more than one input variable. Thereafter, one or more output control variables from among the plurality of intermediate variables can be calculated for calibration of the color output device, such that at least one of the intermediate variables is generally dependent upon one or more uncalibrated control variables from among a group of uncalibrated control variables.

The pre-determined transformation can be configured with an architecture that includes a plurality of fixed transforms whose output can be respectively provided to a plurality of two-dimensional look-up tables (LUTs), which generates calibrated control values thereof for calibration of the color output device.

BRIEF DESCRIPTION OF THE DRAWINGS

The accompanying figures, in which like reference numerals refer to identical or functionally-similar elements throughout the separate views and which are incorporated in and form part of the specification further illustrate embodiments of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

The present invention is generally directed toward the utilization of two-dimensional calibration transforms in the calibration architecture for color devices. The two-dimensional calibration method and system described herein enables significantly more control than traditional one-dimensional calibration, while memory and computational requirements thereof are quite reasonable. The invention described herein can be readily embodied in real time image paths for high speed printing applications.

Throughout the description indicated herein, several definitions can consistently apply. The term "input control values" refers generally to values that are input to the calibration transform described herein. The term "output control values" refers to values that are output from the calibration transform and that directly drive the device. Additionally, the term "intermediate control values" can refer to intermediate variables computed from the input control variables in the process of computing output variables.

The present invention can also enable control of multiple aspects of the device characteristics. For example, one embodiment of the method and system described herein allows independent control of the device behavior along the individual C, M, and Y axes and along the device gray axis (C=M=Y, K=0) and along a secondary color, for instance a device-blue axis (C=M, Y=K=0). The additional control ability afforded by the present invention can be particularly useful in non-conventional imaging devices that are often required to emulate the characteristics for other devices. An example of such a device is a Xerox Docucolor IGen3 xerographic print engine that can emulate an offset (SWOP) press. Another example of such a device is a liquid crystal display (LCD) that emulates a cathode-ray-tube (CRT) display.

Figure 1:
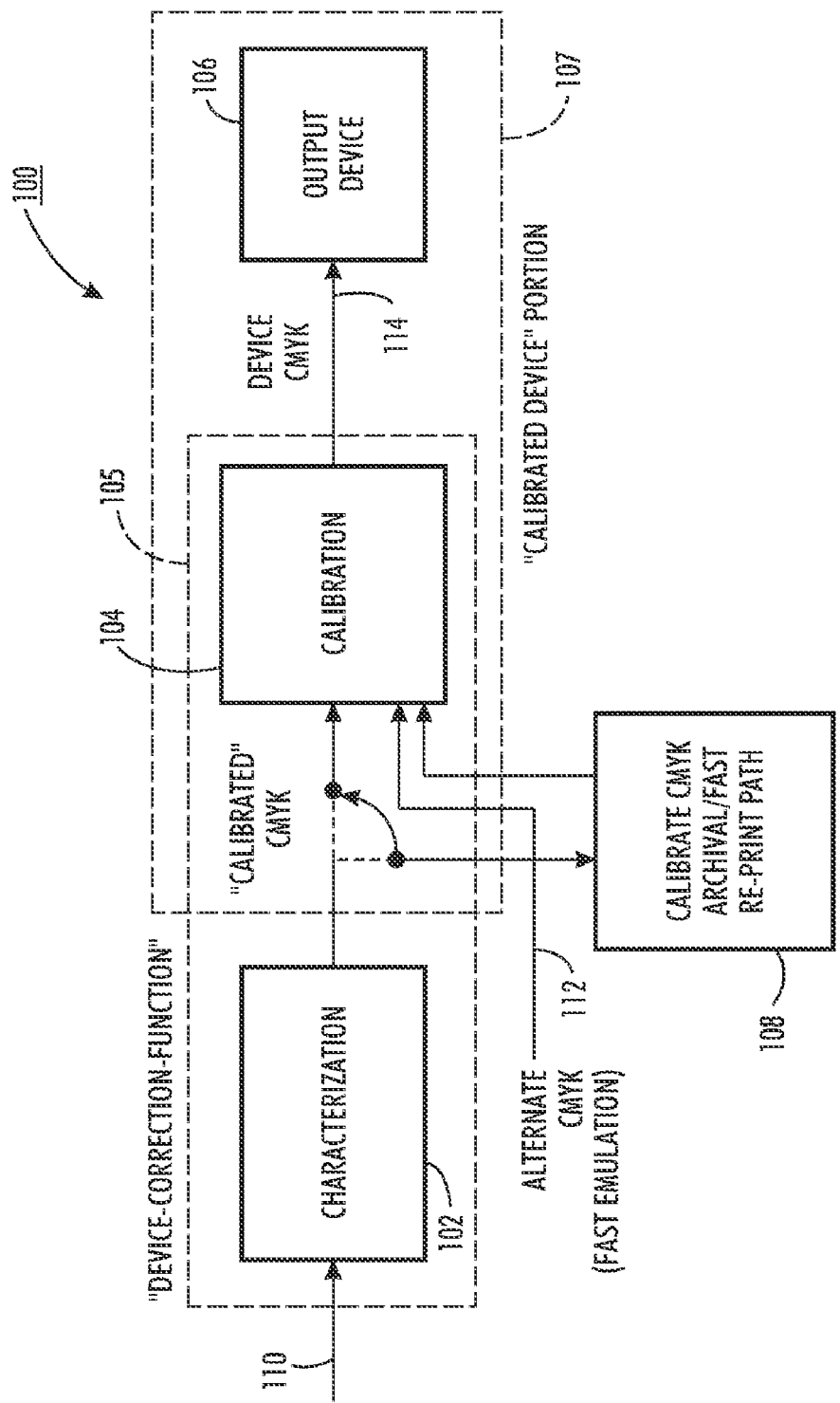
FIG. 1 illustrates a conventional system, which partitions "device-correction function" into characterization and calibration.
Figure 2:
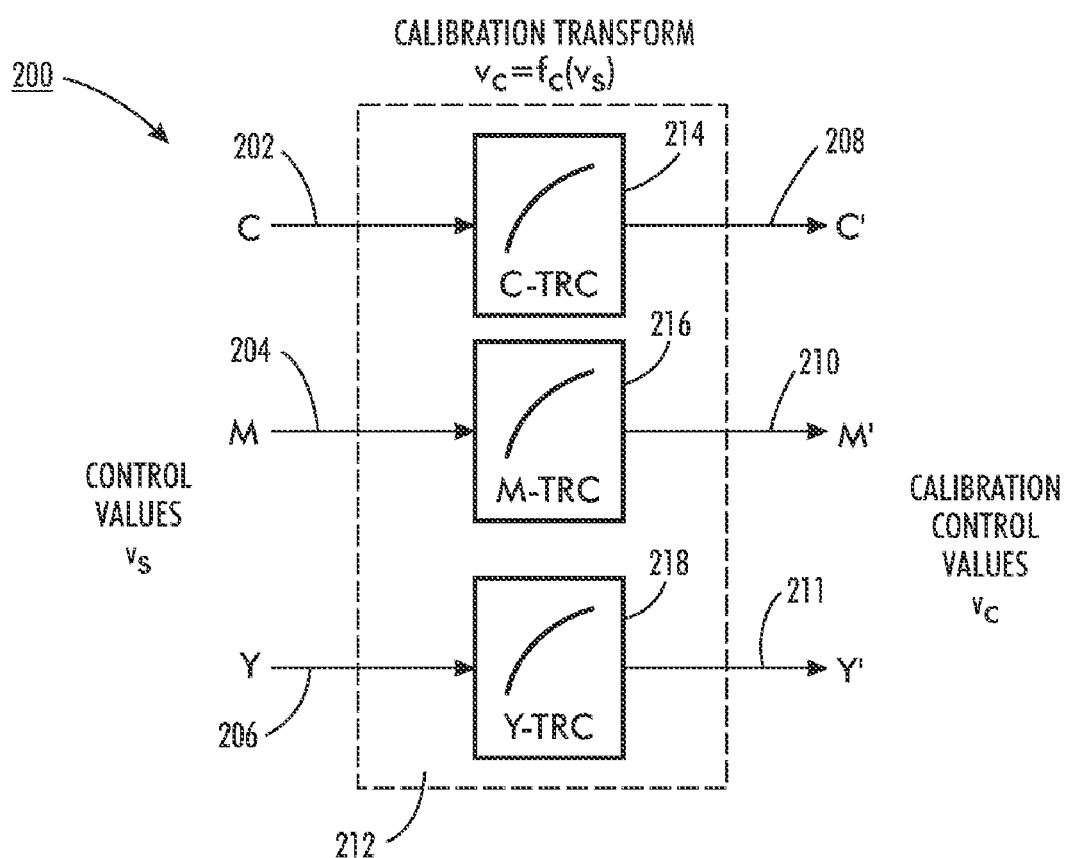
FIG. 2 illustrates a traditional three-color one-dimensional calibration transformation system.
Figure 3:
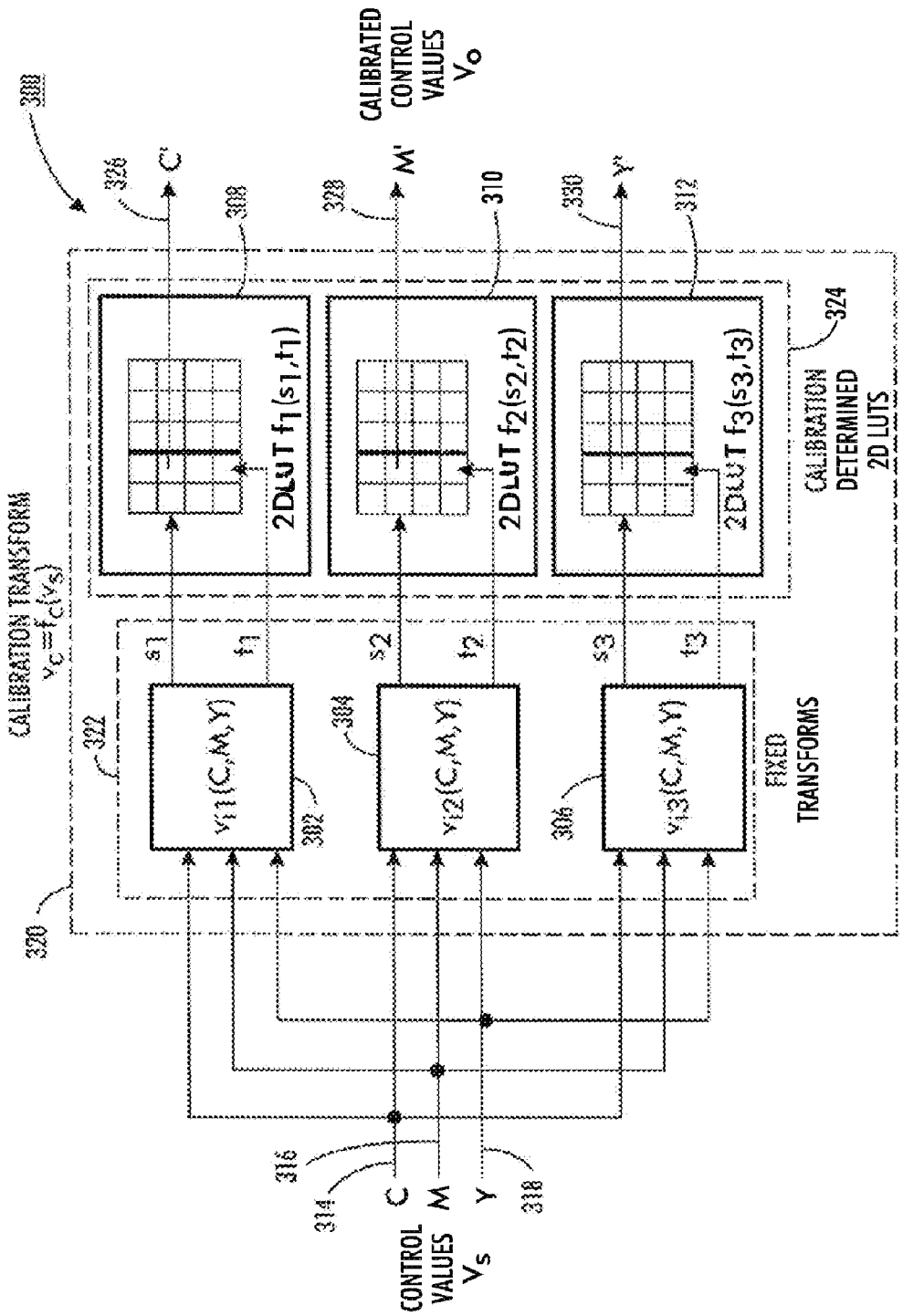
FIG. 3 illustrates a two-dimensional calibration transformation system, which can be implemented in accordance with an embodiment of the present invention.

FIG. 3 illustrates a two-dimensional calibration transformation system 300, which can be implemented in accordance with an embodiment of the present invention. Input control values 314, 316, and 318 are respectively associated with the colors C, M, and Y, as indicated in FIG. 3. System 300 further includes a calibration transformation 320 that is composed generally of fixed transforms 322 and calibration determined two-dimensional LUTs 324. Fixed transforms 322 are composed of individual transforms 302, 304 and 306, while the two-dimensional LUTs 324 are composed of two-dimensional LUTs 308, 310 and 312.

System 300 can permit the use of two-dimensional LUTs for printer control applications. Mathematically, the concept of two-dimensional LUTs for calibration transformation 320 is based on mapping input CMY control values to output C'M'Y' control values, which is indicated respectively by arrows 326, 328, and 330. The calibration transformation 320 can be expressed in general terms, by utilizing two intermediate control variables for each output variable as a function of input CMY, such that the output C', M', and Y' are determined by the corresponding two intermediate variables, as indicated by equations (3) to (8) below:

$$(s_1, t_1) = v_{i1}(C, M, Y) \quad (3)$$

$$(s_2, t_2) = v_{i2}(C, M, Y) \quad (4)$$

$$(s_3, t_3) = v_{i3}(C, M, Y) \quad (5)$$

$$C' = f_1(s_1, t_1) \quad (6)$$

$$M' = f_2(s_2, t_2) \quad (7)$$

$$Y' = f_3(s_3, t_3) \quad (8)$$

where $s_i$, $t_i$ are intermediate control values that depend on the input CMY control values. Intermediate control values, which are depicted in FIG. 3 generally include $s_1$, $t_1$, $s_2$, $t_2$, and $s_3$, $t_3$. The output C' can be determined by $s_1$, $t_1$, which the output M' can be determined by $s_2$, $t_2$. Similarly, the output Y' can be determined by $s_3$, $t_3$ which are illustrated in FIG. 3.

For the purpose of calibration, the desired response can be specified along multiple curves in color space with certain constraints, or along two-dimensional manifolds in CMY space with certain constraints. The response in the rest of color space is an outcome over which no control is directly exercised. In practice, the response over the remainder of color space is a by-product of the specified calibration response over the specified curves or manifolds. For example, all points in input CMY space that are mapped to the same $(s_1, t_1)$ pair in the first stage pre-determined transformation will map to the same output C' value.

The transformation from CMY to the intermediate variables $\{s_k, t_k\}$ can impose constraints on the control that can be accomplished utilizing the calibration architecture described above. Some of these constraints are described in greater detail herein for specific embodiments of the present invention. Some examples of desirable control that can be achieved with two-dimensional LUTs are also illustrated herein with respect to preferred and alternative embodiments of the present invention.

One advantage of the approach described herein is that because the calibration can maintain the desired response at more points than was possible with traditional one-dimensional calibration, the device stability attained by means of the calibration can be significantly improved for most printers. Additionally, three two-dimensional LUTs can be utilized to implement the calibration transformation. For example, the use of full resolution lookup without interpolation can still result in reasonable storage and memory requirements for high end printing applications.

For the total processing and memory complexity to be low, the parameters $s_k$, $t_k$ should be computationally simple transformations of input C, M, Y or be computable utilizing LUTs with a reasonable storage requirement. Additionally, it can be appreciated that the effort required for the derivation of the calibration lies somewhere between the one-dimensional and three-dimensional cases.

Figure 4:
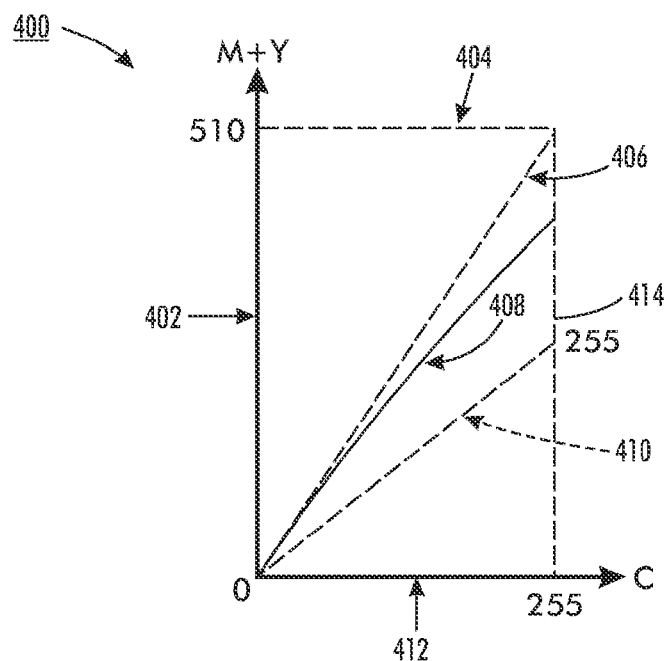
FIG. 4 illustrates a graph, which depicts a two-dimensional calibration LUT $f_1$ that maps [C, M+Y] to C', in accordance with an embodiment of the present invention.

FIG. 4 illustrates a graph 400 which depicts a two-dimensional calibration LUT $f_1$ that maps [C, M+Y] to C', in accordance with a first and preferred embodiment of the present invention. For this embodiment, the intermediate variables $s_i$, $t_i$ can be defined in terms of the input CMY control variables according to equations (9) to (14) as follows:

$$s_1 = M + Y \quad (9)$$

$$s_2 = C+Y \qquad (10)$$

$$s_3 = C+M \qquad (11)$$

$$t_1 = C \qquad (12)$$

$$t_2 = M \qquad (13)$$

$$t_3 = Y \qquad (14)$$

The LUT $f_1$ for the cyan mapping is a function of two variables: i) input C and ii) sum of M and Y. Analogous relationships hold for $f_2$, $f_3$, the LUTs for Magenta and Yellow mapping. As described in the equations above, the output control value M' can be determined from the intermediate variables $s_2=(C+Y)$ and $t_2=M$ utilizing the LUT $f_2$. Similarly, the output control value Y' can be determined from the intermediate variables $s_3=(C+M)$ and $t_3=Y$ utilizing the LUT $f_3$. FIG. 4 illustrates the two-dimensional domain of the LUT $f_1$, including examples of certain paths along which desired response characteristics can be maintained. Examples of such paths include, for example "aim curves", which are defined in greater detail in the following paragraphs.

An aim curve may be thought of as a desired correspondence between a curve in the space of input control variables and a curve in device independent color space. The correspondence established by the aim curve represents the desired response required for input control variables and the goal of the calibration transform is typically to establish this correspondence. A single general curve could be parameterized with a single parameter t taking values over the range 0 to 1.

The aim curve can then be expressed, for example, as a correspondence of the curves established by a parameter t, according to relation (15) below:

$$\bar{p}_C(t) \Rightarrow \bar{p}_L(t) \text{ for } 0 \leq t \leq 1.0 \qquad (15)$$

where $\bar{p}_C(t)$ represents a set of input control values and $\bar{p}_L(t)$ represents the corresponding device independent (for example CIELAB) values for the device. This mathematical formulation can be referred to as an aim curve.

For any given value of the parameter t, relation (15) specifies that the input control variables $\bar{p}_C(t)$ should produce the response $\bar{p}_L(t)$ and thus establishes a correspondence for a point. As the parameter t is varied, it sweeps out a curve in both the space of input control variables and in CIELAB space where there is a point-by-point mapping from the curve in the space of input control variables to CIELAB space.

Typically, the aim curve has been defined as the neutral axis in CIELAB space (a=b=0) and the corresponding curve in CMY space is the straight line defined by C=M=Y, or the curve for a standard such as SWOP or common industrially used version of SWOP (e.g. commercial SWOP). The approach, however, may be generalized and applied to arbitrary curves.

The correspondence for aim curves may be generally defined in any arbitrary device independent color space and is not limited to the CIELAB space. The goal of the calibration transform is to map the input control variables into output control variables in a manner that preserves the correspondence established by the aim curve: For each value of the parameter t, when an input control value $\bar{p}_C(t)$ is mapped through the calibration transformation, the resulting output control values can be utilized to drive the color output device, wherein the response produced by the device is $\bar{p}_L(t)$ in device independent color representation.

With reference to the example illustrated in FIG. 4, control can be achieved along the pure C axis, indicated by axis C (i.e. 0 to 255). Additionally, control along the "device gray axis", C=M=Y can be indicated by line 406. As an alternative to the device gray axis, control along the gray axis for an offset (SWOP) press is shown by line 408. Control along the red-to-black axis is shown by line 404. Finally, axis 402 can be used to achieve variable highlight (starting point) control of the cyan separation as a function of the sum of the other two separations. Axis 414 similarly provides variable shadow control for the Cyan separation as a function of the sum of the other two separations.

Note that it is possible utilizing this scheme to simultaneously accomplish some level of control along device-secondary axes (i.e. along device-blue C=M, Y=0; device green C=Y, M=0; and device red M=Y, C=0 axes respectively). Often the hue along the printer's native blue axis (C=M) is purple and not truly blue. In such a case, it may be desirable to utilize the calibration to produce a blue hue along the C=M axis. This approach may be particularly useful for saturation rendering paths for which a full three-dimensional characterization transform is often unnecessary. This approach can be achieved via the described embodiment. With some additional analysis, it is also possible to define and control the response in a region corresponding to flesh tones. Independent control in these regions is often desired in color output devices, but is generally unachievable with the standard 1-D calibration architecture.

The calibration process for LUT $f_1$ provides the C' necessary to achieve the desired aims along these axes. These C' are inserted in the appropriate locations in the two-dimensional LUT. The rest of the LUT can then be filled with some form of interpolation or mathematical fitting function. This process is repeated for the LUTs $f_2$ and $f_3$ to yield M' and Y' respectively. Appropriate constraints must be placed on the functions $f_1$, $f_2$, and f3. For example, $f_1$ must be monotonic with respect to input C. Other constraints are normally required in practice.

Note that any given input point ($p_1$, $p_2$) in the two-dimensional LUT of FIG. 4 corresponds to a line in CMY space formed by the intersection of the two planes C=$p_1$, M+Y=$p_2$. All points along this line will thus map to the same C'. This compromise is less severe than the one encountered in 1D calibration, where an entire plane maps to the same output C'.

For 8-bit input CMY images, three two-dimensional LUTs (e.g., each LUT of size 256×511 bytes) can be utilized. Hence the overall size is just under 400 Kbytes, which should be an acceptable requirement in high-end systems. An architecture, which allows more than 8-bits of output to be utilized in conjunction with half toning, is also very feasible as the storage requirements for 16-bit output are also under 800 K bytes.

The computational processing comprises three additions to compute the $s_i$ and three two-dimensional table lookups per pixel. This is substantially much more inexpensive than a three-dimensional tetrahedral interpolation, which generally requires three multiplications, three additions, and four three-dimensional table lookups per pixel. If the addition operations result in a bottleneck, such operations can always be pre-computed and stored within another set of three two-dimensional LUTs. Such an approach can provide a sequential two-dimensional LUT structure. The appropriate strategy depends on the platform utilized, and whether or not hardware assistance is also required.

It will also be apparent to those familiar with the art that for implementation purposes the two-dimensional LUTs may be "flattened out" into a one-dimensional LUT that is equivalent to the two-dimensional LUT (i.e., it represents the same transformation). For instance, for 8-bit input CMY images, a two-dimensional table indexed by C and (M+Y) may be flattened out into a single equivalent one-dimensional table indexed by the variable 512*C+(M+Y). This concept is generally applicable to any embodiment of the current invention and several different mappings are possible for the "flattening".

As alluded to earlier, measuring step wedges along the primary and secondary axes, as well as patches in the vicinity of the neutral axis can derive the calibration. Although the embodiment has been described with the assumption that a neutral response is desired along the C=M=Y axis, this is not considered a limiting feature of the present invention. The two-dimensional calibration scheme described generally herein therefore not only promotes enhanced emulation capabilities, but also ensures that the calibrated device is more stable than is possible with traditional one-dimensional calibration, because the calibration process "pins-down" the desired response at more locations.

Figure 5:
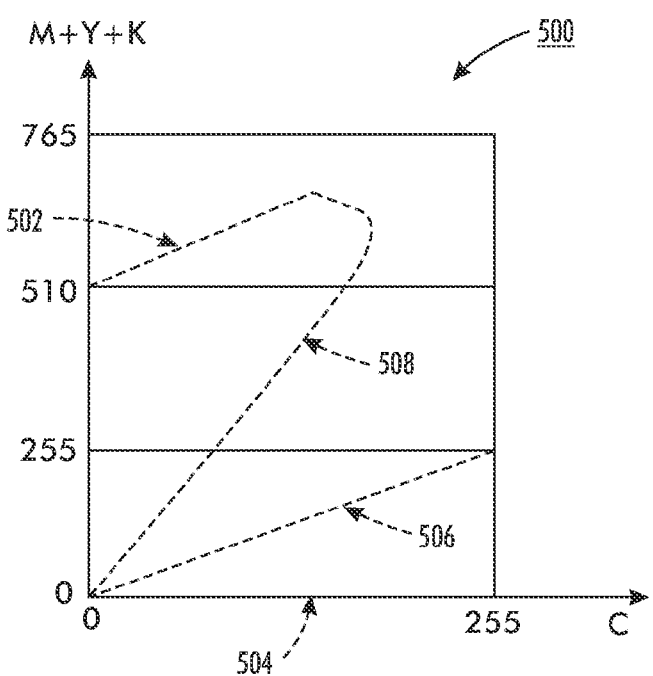
FIG. 5 illustrates a graph, which depicts a two-dimensional calibration LUT $f_1$ that maps [C, M+Y+K] to C', in accordance with an alternative embodiment of the present invention.

FIG. 5 illustrates a graph 500, which depicts a two-dimensional calibration LUT $f_1$ that maps [C, M+Y+K] to C', in accordance with a second and an alternative embodiment of the present invention. Graph 500 addresses calibration of a CMYK printer. In the following description two-dimensional LUTs are indicated for C, M and Y with the assumption that K can be handled independently. The intermediate control variables $s_i$, $t_i$ can be defined in terms of the input control variables C, M, Y, and K according to equations (16) to (21) as follows:

$$s_1 = M+Y+K \quad (16)$$

$$s_2 = C+Y+K \quad (17)$$

$$s_3 = C+M+K \quad (18)$$

$$t_1 = C \quad (19)$$

$$t_2 = M \quad (20)$$

$$t_3 = Y \quad (21)$$

The LUT $f_1$ for the cyan mapping is a function of two variables: i) input C and ii) sum of M, Y and K. Analogous relationships hold for $f_2$, $f_3$, the LUTs for Magenta and Yellow mapping. Graph 500 therefore illustrates the two-dimensional domain of the LUT $f_1$, along with examples of certain paths along which the desired response characteristics can be maintained. Control along a pure C axis can be indicated by axis 504 (i.e., 0 to 255). Control along the device secondary axes (e.g., C=M, Y=0, K=0; C=Y, M=0, K=0; C=K, M=0, Y=0) is generally indicated by line 506. Control along the line from device MY or YK to black is indicated by line 502. Finally, control along neutrals for typical UCR/GCR is indicated by line 508

For graph 500, a typical UCR/GCR strategy is assumed along the neutral axis. The strategy assumes almost no K in the light grays (where the use of CMY composite black typically produces smoother grays) and gradually introduces K when approaching the darker colors. The C, M, and Y colors are reduced as K is increased beyond a certain limit to meet ink-limit constraints. The resulting curve in input CMYK space maps to a curve of the type shown as 508 in graph 500.

Subject to suitable constraints, desired response characteristics can be specified along each of these curves, which is often desirable. Note that with this architecture, the storage requirements may modestly increase (e.g., by a factor of approximately 2), but are still reasonable. Measurement and computation requirements are also reasonable for this scheme.

In accordance with a third and alternative embodiment of the present invention, it can be appreciated that the device-blue axis (C=M, Y=K=0) for printers often has a hue that is quite different from monitor blue hue and for saturation rendering intent. it is often desirable to compensate of this characteristic. As will be appreciated by those skilled in the art, saturation rendering intent attempts to capture desired rendition characteristics for synthetically generated graphics such as sweeps, blocks, etc.

In traditional one-dimensional calibration this cannot however be accomplished without compromising individual channel responses. The present embodiment is aimed at remedying this problem. For this embodiment, it can be assumed that both K and Y are handled by traditional one-dimensional trcs that allow independent channel linearization and two-dimensional LUTs used for C' and M both and indexed by both C and M. The resulting architecture allows independent channel linearization for the C and M channels and a two-dimensional response specification along the device-blue axis (C=M, Y=K=0).

Note in general that calibration can be performed for color printers utilizing a front end with a user interface. Such an interface can allow for printing of targets, which can be subsequently measured. The resulting measurements can be utilized to determine the calibration transform, which is loaded into the printer.

The present invention can also be applied to the calibration of color display devices. Normally, display calibration is accomplished by correcting the tone response of the individual primary channels, red (R), green (G), and blue (B) with one-dimensional functions, and assuming that this correction applies for all possible mixtures of R, G, B. For some display technologies, notably LCDs, the display's response along the neutral (R=G=B) axis, and secondary axes (R=G, R=B, G=B) can be substantially different from that along the primary axes. In this case, the proposed 2-D calibration architecture can be utilized to apply different controls and correction functions along the different axes.

Figure 6:
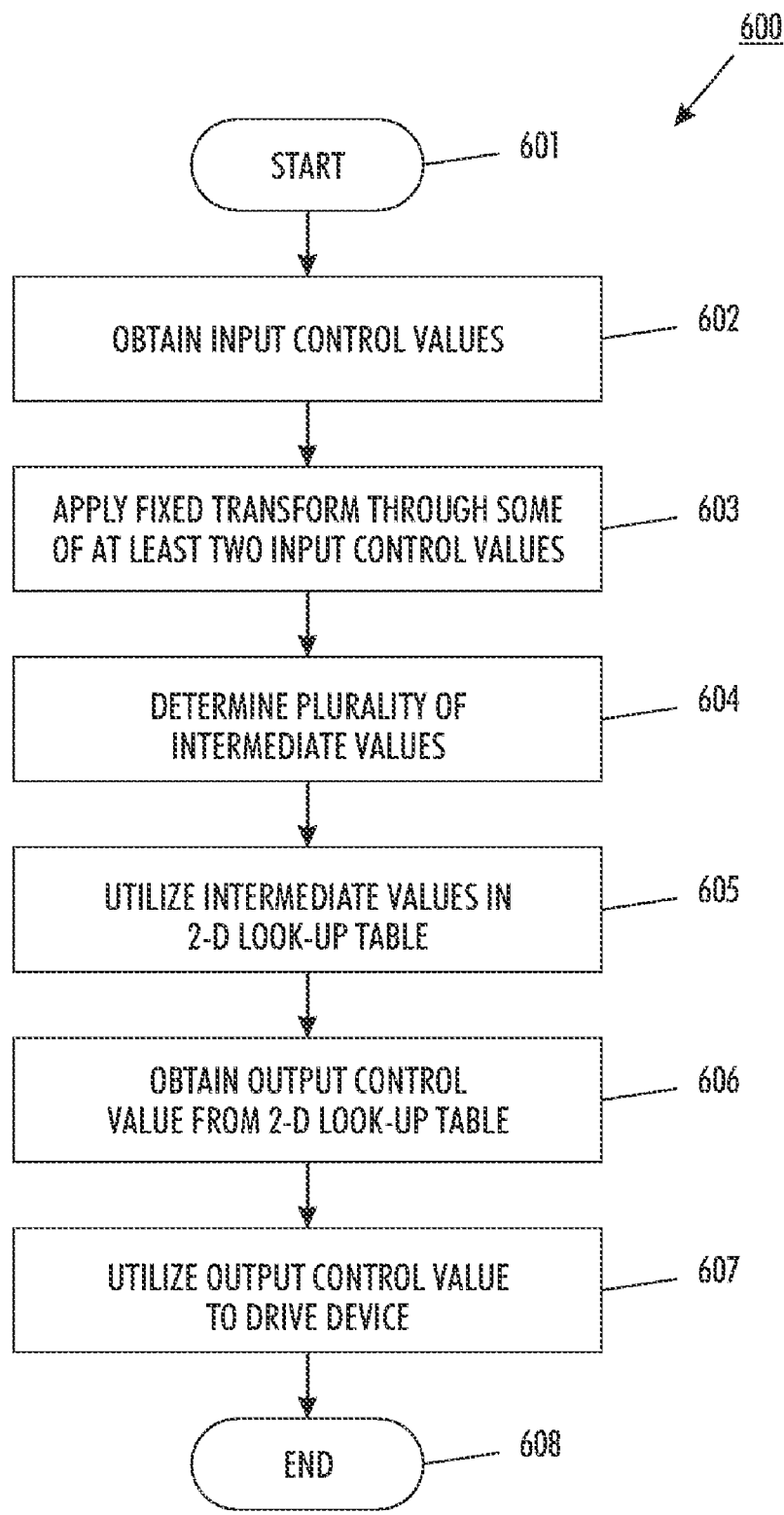
FIG. 6 illustrates a flow diagram depicting logical operation steps, which can be utilized to implement a preferred embodiment of the invention.

FIG. 6 illustrates a flow diagram 600 depicting logical operation steps of a two-dimensional calibration method. The method starts at block 601 and follows, as illustrated at block 602, with obtaining the input control values. Block 603 illustrates the step of applying a fixed transform through summation of at least two input control values. This summation results in the next step, block 604, as determining a plurality of intermediate values. These intermediate values determined at block 604 are utilized in the next step, block 605, which indicates that the intermediate values are utilized in a two-dimensional look-up table. The next step, indicated at block 606, is obtaining output control values from the two-dimensional look-up table. These output control values are then utilized, as illustrated in block 607, to drive the color device. The method then ends as illustrated at block 608.

Figure 7:
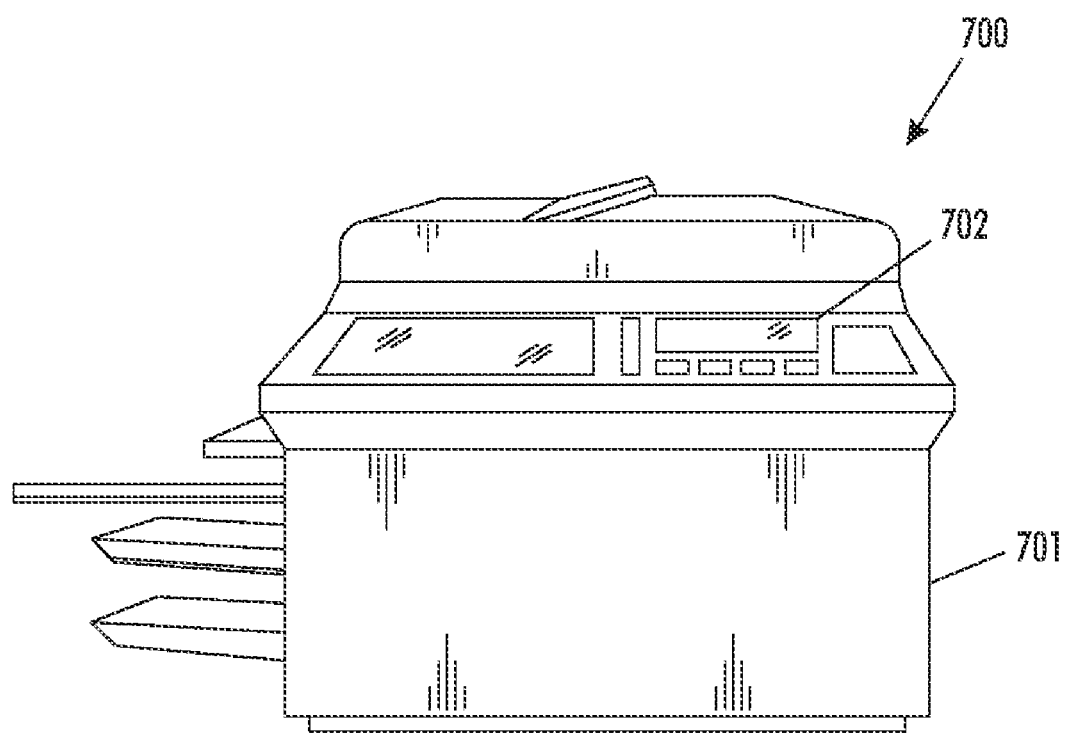
FIG. 7 illustrates a color output device in accordance with an embodiment of the present invention.

FIG. 7 illustrates a color output system 700, in a possible embodiment. This system 700 includes the color output device 701 as an exemplary illustration only and is not meant to limit the invention to any single type of output color device. Color output device 701 includes a user interface 702.

It is appreciated that various other alternatives, modifications, variations, improvements, equivalents, or substantial equivalents of the teachings herein that, for example, are or may be presently unforeseen, unappreciated, or subsequently arrived at by applicants or others are also intended to be encompassed by the claims and amendments thereto.

The invention claimed is:

1. A method for controlling a color output device, said method comprising:
    applying a two-stage calibration transform wherein the first-stage transform of said two-stage transform comprises a fixed pre-determined transformation to at least two input control values to obtain a plurality of intermediate values, and
    applying a second-stage transform of said two-stage transform by determining at least one output control value from said plurality of intermediate values utilizing a two-dimensional look-up table with inputs of two intermediate variables of said plurality of intermediate values for control of said color output device.

2. The method of claim 1 wherein said color output device is driven by said at least one output control value.

3. The method of claim 1 wherein said color output device is driven by at least three output control values including said at least one output control value.

4. The method of claim 1 wherein determining at least one output control value from said plurality of intermediate values utilizing two intermediate values of said plurality of intermediate values for control of said color output device, further comprises:
    determining said at least one output control value utilizing a said two-dimensional lookup table that maps said two intermediate values to said at least one output control value.

5. The method of claim 1 wherein at least one of said two intermediate values is a function of a sum of at least two input control values.

6. The method of claim 1 further comprising associating a user interface with a color output device, wherein said user interface permits a user to independently specify a desired response along a plurality of paths in input control variable space.

7. The method of claim 6 wherein said plurality of paths includes a single colorant axis and a neutral axis.

8. A method for controlling a color output device, said method comprising:
    applying a two-stage calibration transform wherein the first-stage transform is a fixed pre-determined transformation to at least two input control values to obtain a plurality of intermediate values, wherein at least one intermediate value of said plurality of intermediate values depends on more than one input control value; and
    applying a second-stage transform of said two-stage transform by determining at least one output control value from said plurality of intermediate variables, wherein at least one output control value is determined utilizing at least one intermediate value of said plurality of intermediate values, which depends on said more than one input control value.

9. The method of claim 8 wherein said at least one intermediate value of said plurality of intermediate values is a function of a sum of at least two input control values of said more than one input control value.

10. The method of claim 8 wherein said at least one intermediate value of said plurality of intermediate values is a sum of at least two input values of said more than one input control value.

11. A system for controlling a color output device, said system comprising:
    a two-stage transform system wherein a first-stage transform of said two-stage transform comprises a fixed pre-determined transformation applied to at least two input control values to obtain a plurality of intermediate variables, and
    a second-stage transform of said two-stage transform system wherein at least one output control value determined from said plurality of intermediate values utilizing two intermediate values of said plurality of intermediate values for control of said color output device.

12. The system of claim 11 wherein said color output device is driven by said at least one output control value.

13. The system of claim 11 wherein said color output device is driven by at least three output control values including said at least one output control value.

14. The system of claim 11 wherein said at least one output control value is determined utilizing a two-dimensional lookup table that maps the said two intermediate values to said at least one output control value.

15. The system of claim 11 wherein at least one of said two intermediate values is a function of a sum of at least two input control values.

16. A system for controlling a color output device, said system comprising:
    a two-stage transform system wherein a first-stage transform of said two-stage transform comprises a fixed pre-determined transformation applied to at least two input control values to obtain a plurality of intermediate values, wherein at least one intermediate value of said plurality of intermediate values depends on more than one input control value; and
    a second-stage transform of said two-stage transform system wherein at least one output control value determined from said plurality of intermediate values, wherein at least one output control value is determined utilizing at least one intermediate value of said plurality of intermediate values, which depends on more than one input control value.

17. The system of claim 16 wherein said at least one intermediate value of said plurality of intermediate values is a function of a sum of at least two input control values of said more than one input control value.

18. The system of claim 16 wherein said at least one intermediate value of said plurality of intermediate values is a sum of at least two input control values of said more than one input control value.

19. The system of claim 16 further comprising a user interface for a color output device, wherein said user interface permits a user to independently specify a desired response along a plurality of paths in input control variable space.

20. The user interface of claim 19 wherein said plurality of paths includes a single colorant axis and a neutral axis.

* * * * *